Feb. 1, 1966　　　　　J. S. LESLIE ETAL　　　　　3,232,336
BLENDING HOT WATER HEATER
Filed Oct. 18, 1963　　　　　　　　　　　　　　2 Sheets-Sheet 1
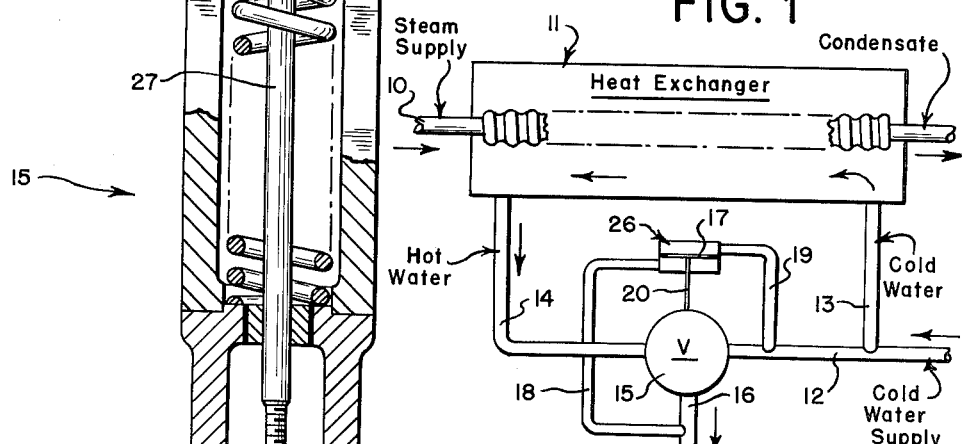
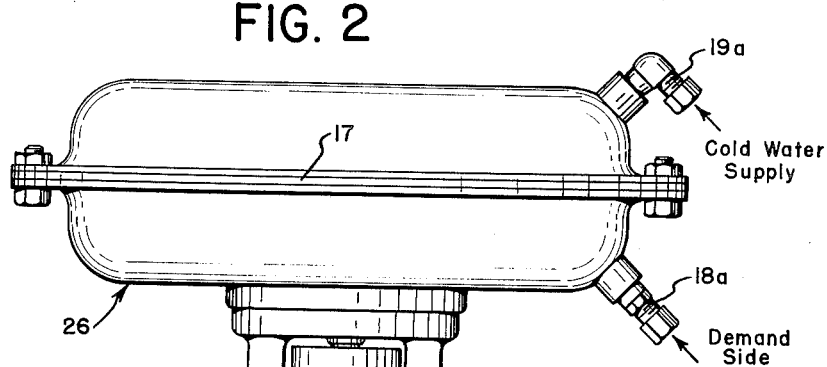
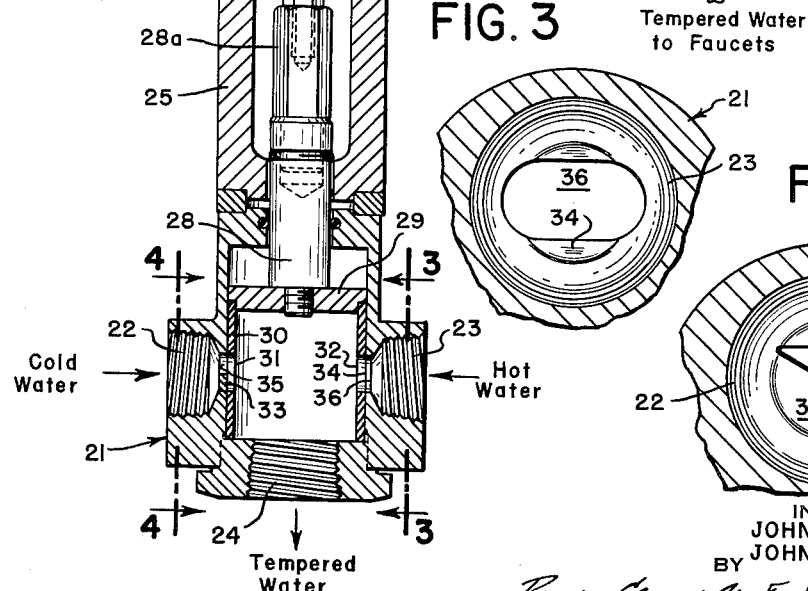
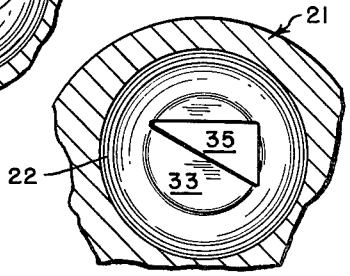
INVENTORS
JOHN S. LESLIE
JOHN T. MULLER
BY
ATTORNEYS

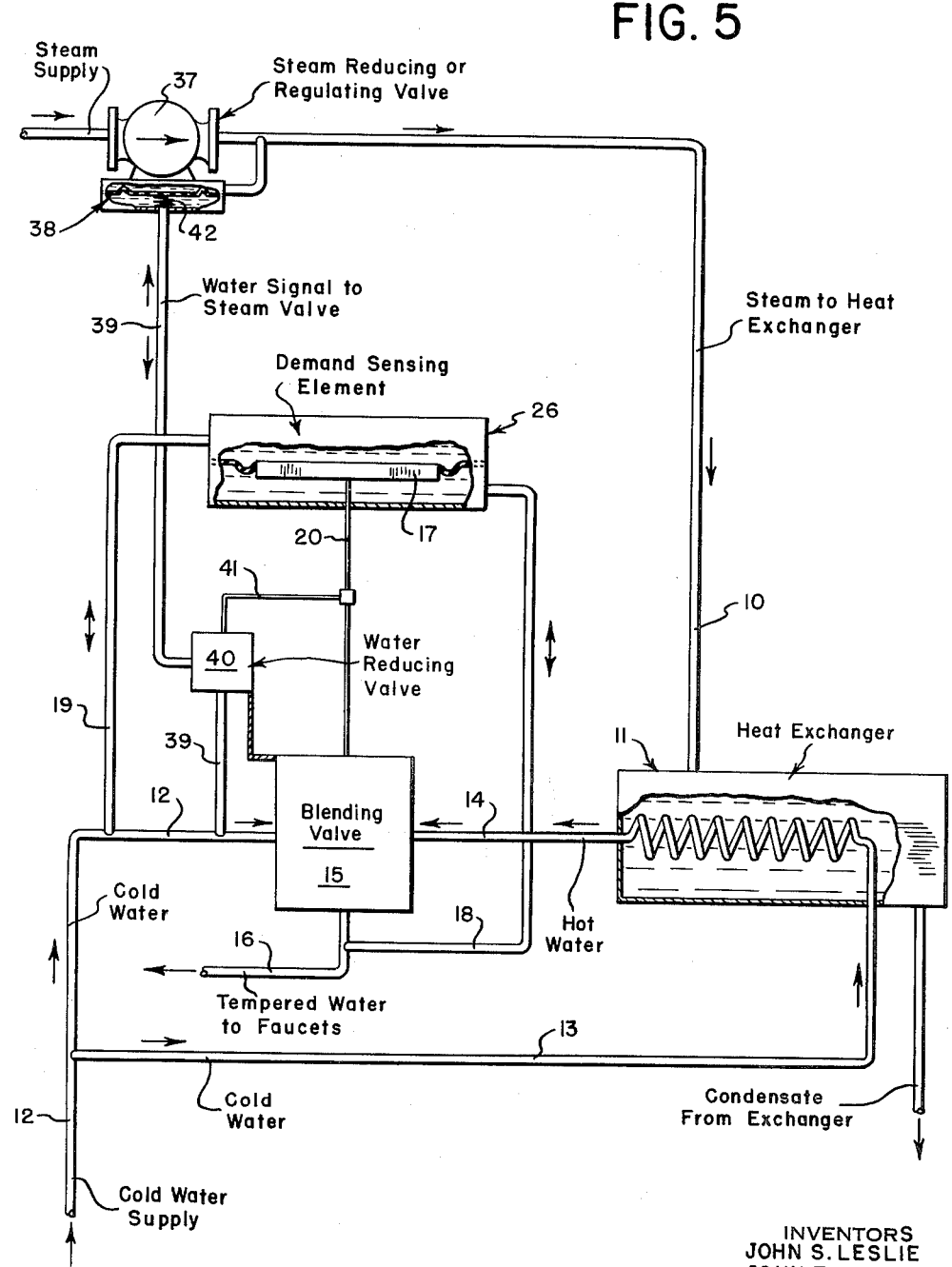

United States Patent Office 3,232,336
Patented Feb. 1, 1966

3,232,336
BLENDING HOT WATER HEATER
John S. Leslie, Ramsey, and John T. Muller, Nutley, N.J., assignors to Leslie Co., Lyndhurst, N.J., a corporation of New Jersey
Filed Oct. 18, 1963, Ser. No. 317,265
6 Claims. (Cl. 165—38)

This invention relates to hot water heater systems and, more particularly, to a blending hot water heater system.

In a conventional hot water heating circuit utilizing a heat exchanger and a thermal sensing feed back system to regulate the heat supply to the water heater in response to demand, it is customary to encounter cycling of the output temperature as a result of thermal lags in the system. This is caused by the period of time which occurs between a corrective action and the effect of the correction on the heater and results in an out-of-phase condition between the flow demands placed on the heater and the heating element, such as steam, supplied to the heater. The magnitude of the out-of-phase time lag varies with the heater construction, the rate of flow through the heater, the manner of installing the sensing element, the size and mass of the sensing element, the materials of construction of the sensing element and the location of the thermal sensing element in the liquid circuit. Practical limitations usually make it difficult to locate the sensing element directly inside the heat exchanger without running so close to the heating surfaces or incoming cold water supply as to give erroneous signals and unstable results. Location of the thermal sensing element close to but outside the heater on its downstream side results in a satisfactory signal at high demand flow rates but in erroneous signals at low flows and serious overheating at a no-flow condition.

Overheating of the water supply is an adverse characteristic of most hot water heating systems. This overheating is caused by an erroneous signal resulting from cooling down of heat exchanger piping at a no-flow condition. The cooling down indicates to the thermal sensing device that steam is required to be supplied to the heater to restore the temperature, and since the unit is unable to feel the effects of its changes at a no-flow condition, it causes steam to be supplied to the heater at a pressure which should normally correspond to a maximum flow rate, despite the fact that a no-flow condition exists. When a subsequent demand is placed upon the heater after a period of no demand, excessively hot water at saturation temperature is supplied to the demand system. At the same time, the thermal sensing system, feeling an elevated temperaure way above its set point, responds with a signal to cut off the steam supply despite the fact that there is now an increase in demand for water.

Although the aforementioned type of heating system can be made to be wholly effective, extremely sophisticated and complicated control modes are necessary to overcome the inherent difficulties experienced with these conventional heat exchanger and thermal sensing temperature regulator systems. We have now found, however, that the uniform water supply characteristics of prior complicated systems can be achieved by a much simpler system involving the blending of a high temperature water supply with a cold water supply in amounts corresponding to the demand for temperate hot water. The blending hot water heater of the present invention comprises a heat exchanger provided with a water inlet and a water outlet, heating means within the exchanger for transforming cold water introduced through the inlet to hot water leaving the outlet, and a blending valve adapted to blend hot and cold water in any desired predetermined proportion. A cold water connection communicates between the cold water inlet to the heat exchanger and the blending valve, and a hot water connection communicates between the hot water outlet from the heat exchanger and the blending valve. A control element is provided for the rate of outlet flow of blended hot and cold water from the blending valve, and connections are provided between this control element and both the outlet side from and one of the inlet sides to the blending valve, whereby the control element is made responsive to a demand for blended water from the outlet of the blending valve. The control element thus provides means for increasing the rate of flow of hot and cold water through the blending valve in the aforesaid proportion in response to the demand for blended hot and cold water from the blending valve. In a further embodiment of the invention, the rate of heat supply to the heat exchanger is controlled as a direct function of the demand for blended or temperate hot water from the blending valve.

These and other novel features of the invention will be readily understood from the accompanying drawings in which FIG. 1 is a schematic diagram of the blending hot water heater of the invention;

FIG. 2 is a side elevation, partly in section, of a blending valve useful in the heating system of the invention;

FIG. 3 is a view taken along line 3—3 in FIG. 2 showing the flow control window with hot water inlet to the blending valve;

FIG. 4 is a view taken along line 4—4 in FIG. 2 showing the flow control window in the cold water inlet to the blending valve; and FIG. 5 is a schematic diagram of another embodiment of the hot water heating system of the invention.

In the blending hot water heater system shown in FIG. 1, a steam supply is admitted through one end of a heating tube 10 positioned within a conventional heat exchanger 11, and steam condensate leaves the other end of the heating tube. Cold water, from a cold water supply line 12, enters the heat exchanger 11 through a cold water inlet line 13, is heated in the exchanger and leaves the exchanger through a hot water outlet line 14. The hot water line 14 communicates with one side of a blending valve 15, and the cold water supply line 12 communicates with the other side of the blending valve 15. The hot and cold water supplied to the valve 15 are blended therein in predetermined proportions and leave the valve as temperate hot water through the valve outlet line 16. This temperate hot water is supplied to faucets, and therefore there is a flow of temperate hot water through line 16 only when a faucet is opened to create a demand. It will also be readily apparent that there is a flow of cold water through lines 12 and 13 and of hot water through line 14 only when the demand for temperate hot water creates a flow thereof from the blending valve through its outlet line 16.

The flow of hot and cold water to the blending valve is controlled in response to the demand for temperate hot water by connecting both the demand side and one of the inlet sides of the blending valve to a control element such as a differential diaphragm 17 or a piston actuator. The control element is thus connected by a demand sense line 18 and a supply sense line 19 to sense a difference in pressure in the blending valve demand and supply lines; in the case of no demand, the pressure in the demand line 16 and in the supply lines 12 and 14 are identical, but when a faucet is opened to create a demand a pressure drop is produced in the demand line 16 and a pressure difference between this line and a supply line is sensed by the control element. The control element, such as the diaphragm 17, is connected by a mechanical linkage 20 to the blending valve 15 in such manner as to increase the flow of hot and cold water in the predetermined proportions into and through the valve to the valve outlet or demand line 16.

A suitable blending valve structure for use in the hot water system of the invention is shown in FIG. 2 wherein the valve is attached to a differential diaphragm type control element. The blending valve comprises a valve body 21 provided with a cold water side inlet 22, a hot water side inlet 23 and a temperate hot water outlet 24. The portion of the valve body opposite the outlet 24 is appropriately mounted on a valve stem frame 25, and on the top of the frame 25 there is mounted a conventional differential diaphragm housing 26. This housing is provided with two sensing inlets, one on each side of the diaphragm 17 within the housing. One sensing inlet 19a is adapted to be connected to the cold water supply line and the other sensing inlet 18a is adapted to be connected to the demand side of the blending valve. The diaphragm is connected by a rod 27 to a valve stem 28 extending from within the frame 25 to the interior of the valve body 21. The end of the stem 28 within the valve body has connected thereto an end plate 29 on which there is mounted a cylindrical sleeve-like valve member 30. The sleeve is provided with two ports 31 and 32 positioned diametrically opposite one another and thus adapted to be aligned with the valve body cold water inlet 22 and hot water inlet 23, respectively. The inner ends of these valve body inlets are provided with inserts or windows 33 and 34, respectively. The two windows are provided with differently shaped openings 35 and 36, respectively, so that as the sleeve valve 30 is rotated about its axis the movement of the valve ports 31 and 32 with respect to the window openings 35 and 36 will provide different sized cold water and hot water inlets into the valve body. By providing the upper portion 28a of the valve stem 28 within the open frame 25 with a hexagonal or equivalent exterior shape, this portion of the valve stem can be rotated about its axis by a wrench inserted into a frame opening so as to rotate the sleeve valve 30 to establish any desired proportioning of the cold water and hot water supplied to the valve body of the blending valve. Axial movement of the valve stem 28, by movement of the valve stem connecting rod 27 in response to movement of the control element diaphragm 17 and in opposition to a diaphragm loading spring 17a, effects axial movement of the sleeve valve 30 so as to control the amount of cold and hot water delivered to the blending valve body in the aforementioned proportions. The shape of at least one of the inlet window openings 35 and 36 is also advantageously such that at any rotational position of the sleeve valve 30 to establish cold and hot water supply proportions, the axial movement of the sleeve and its ports 31 and 32 will further cooperate with the window openings to vary the cold and hot water supplied at varying demand flows so as to maintain a substantially uniform temperature of the temperate hot water leaving the blending valve at all demand flow rates.

The modification of the blending hot water heater system shown in FIG. 5 basically is identical with that shown in FIG. 1. However, the system shown in FIG. 5 is further provided with a heat exchanger control circuit. This circuit features a steam regulating valve 37, advantageously a conventional steam pressure reducing valve. The regulating valve 37 is controlled by an associated diaphragm 38 the sensing side of which communicates through a line 39 with the cold water supply line 12 as shown in the drawing, or with any other controllable fluid supply such as the steam supply line to the valve 37 or to a compressed air supply line. The opposite side of diaphragm 38 communicates with steam line 10 which supplies steam to the heat exchanger. The steam valve control line 39 is interrupted by a control valve 40, such as a conventional water pressure reducing valve, and this control valve in turn is controlled by a mechanical linkage 41 which interconnects the control valve 40 with the mechanical linkage 20 between the blending valve and its sensing diaphragm 17. Thus, movement of the blending valve sensing diaphragm 17 in response to a demand for temperate hot water causes a simultaneous control of the water control valve 40 and the steam control valve diaphragm 38 so as to increase the steam pressure delivered by the valve 37 to the heat exchanger 11. The steam control valve is advantageously set so that at zero demand for temperate hot water the steam pressure supplied to the heat exchanger will be just sufficient to maintain hot water in the exchanger and so that at full demand for temperate hot water the steam pressure will be sufficient to maintain a substantially constant supply of hot water from the exchanger to the blending valve. In this way the temperature of the hot water supply to the blending valve can be maintained without using any thermal sensing element with its attendant sensing lag. The temperature of the temperate hot water supply from the blending valve in this system has been demonstrated to be substantially constant over the range from minimum to maximum sustained demand flow rates.

In any of the modifications of the blending hot water heater system shown or suggested herein, a simple safety control for the heat exchanger can be provided to insure that, in case of rupture of the wall between the steam and water supplied to the exchanger, there can be no escape of high pressure steam into the hot water supply line from the exchanger to the blending valve. This safety control is shown in FIG. 5 wherein the control element for the steam control valve 37 includes a load spring 42 supplementing the pressure of the cold water supply control for the valve. The load on the diaphragm provided by the spring, even though of the order of only a few pounds, maintains a lower steam pressure than the cold water control pressure at all times. Thus, in the event of a wall rupture in the exchanger, the direct mixing of steam and water in the exchanger will always be in the direction of the flow of cold water into the steam side and never the flow of steam directly into the water supply side of the exchanger.

It will be readily apparent that the blending hot water heater of this invention is not limited to the use of steam as the water heating source and that other alternative heat sources used heretofore in hot water supply systems can be used.

We claim:

1. A blending hot water heater which comprises a heat exchanger provided with a water inlet and a water outlet, heating means within the exchanger for transforming cold water introduced through the inlet to hot water leaving the outlet, a blending valve constructed to blend hot and cold water in any desired predetermined proportions, a cold water connection communicating between the cold water inlet to the heat exchanger and the blending valve, a hot water connection communicating between the hot water outlet from the heat exchanger and the blending valve, a control element connected to the blending valve for controlling the rate of flow of hot and cold water through the blending valve in said predetermined proportions, and connections between the control element and both the outlet side from and one of the inlet sides to the blending valve whereby the control element is responsive to a demand for blended water from the outlet of the blending valve.

2. A blending hot water heater which comprises a heat exchanger provided with a water inlet and a water outlet, heating means within the exchanger for transforming cold water introduced through the inlet to hot water leaving the outlet, a blending valve constructed to blend hot and cold water in any desired predetermined proportions, a cold water connection communicating between the cold water inlet to the heat exchanger and the blending valve, a hot water connection communicating between the hot water outlet from the heat exchanger and the blending valve, a control element connected to the blending valve for controlling the rate of flow of hot and cold water through the blending valve in said predetermined proportions, and connections between the control element and both the outlet side from and the cold water inlet side to the blending valve whereby the control element is responsive to a demand for blended water from the outlet of the blending valve.

3. A blending hot water heater which comprises a heat exchanger provided with a water inlet, a water outlet, and a steam supply inlet for transforming cold water introduced through the water inlet to hot water leaving the water outlet, a blending valve constructed to blend hot and cold water in any desired predetermined proportions, a cold water connection communicating between the cold water inlet to the heat exchanger and the blending valve, a hot water connection communicating between the hot water outlet from the heat exchanger and the blending valve, a control element connected to the blending valve for controlling the rate of flow of hot and cold water through the blending valve in said predetermined proportions, and connections between the control element and both the outlet side from and one of the inlet sides to the blending valve whereby the control element is responsive to a demand for blended water from the outlet of the blending valve.

4. A blending hot water heater which comprises a heat exchanger provided with a water inlet, a water outlet, and a steam supply inlet for transforming cold water introduced through the inlet to hot water leaving the outlet, a blending valve constructed to blend hot and cold water in any desired predetermined proportions, a cold water connection communicating between the cold water inlet to the heat exchanger and the blending valve, a hot water connection communicating between the hot water outlet from the heat exchanger and the blending valve, a control element connected to the blending valve for controlling the rate of flow of hot and cold water through the blending valve in said predetermined proportions, connections between the control element and both the outlet side from and one of the inlet sides to the blending valve whereby the control element is responsive to a demand for blended water from the outlet of the blending valve, a pressure control valve for the steam supply to the heat exchanger, and control means responsive to the demand for blended hot and cold water from the blending valve for controlling the pressure of steam for heating cold water admitted to the heat exchanger in response to said demand.

5. A blending hot water heater which comprises a heat exchanger provided with a water inlet, a water outlet, and a steam supply inlet for transforming cold water introduced through the inlet to hot water leaving the outlet, a blending valve constructed to blend hot and cold water in any desired predetermined proportions, a cold water connection communicating between the cold water inlet to the heat exchanger and the blending valve, a hot water connection communicating between the hot water outlet from the heat exchanger and the blending valve, a control element connected to the blending valve for controlling the rate of flow of hot and cold water through the blending valve in said predetermined proportions, connections between the control element and both the outlet side from and the cold water inlet side to the blending valve whereby the control element is responsive to a demand for blended water from the outlet of the blending valve, a pressure control valve for the steam supply to the heat exchanger, a connection between the steam control valve and the cold water inlet to the heat exchanger adapted to utilize the pressure of the cold water supply for actuating the steam control valve, cold water pressure control means interposed in the last mentioned connection, and means for actuating said cold water pressure control means in such manner as to cause an increase in the pressure of steam supplied to the heat exchanger in response to an increase in the demand for blended hot and cold water from the blending valve.

6. A blending hot water heater which comprises a heat exchanger provided with a water inlet and a water outlet, steam heating means within the exchanger for transforming cold water introduced through the inlet to hot water leaving the outlet, a blending valve constructed to blend hot and cold water in any desired predetermined proportions, a cold water connection communicating between the cold water inlet to the heat exchanger and the blending valve, a hot water connection communicating between the hot water outlet from the heat exchanger and the blending valve, a control element connected to the blending valve for controlling the rate of flow of hot and cold water through the blending valve in said predetermined proportions, connections between the control element and both the outlet side from and one of the inlet sides to the blending valve whereby the control element is responsive to a demand for blended water from the outlet of the blending valve, and a steam supply valve adapted to control the pressure of the steam supply to the heat exchanger to a value below the pressure of the cold water supply to the exchanger.

References Cited by the Examiner

UNITED STATES PATENTS

| 1,897,845 | 2/1933 | Hilgers. | |
|---|---|---|---|
| 2,006,035 | 6/1935 | Stewart | 236—23 |
| 3,047,274 | 7/1962 | Wilson | 165—38 |

FOREIGN PATENTS

| 773,505 | 9/1934 | France. |
| 773,328 | 4/1957 | Great Britain. |

ROBERT A. O'LEARY, *Primary Examiner.*

ALDEN D. STEWART, *Examiner.*